United States Patent
Huang et al.

(10) Patent No.: US 8,319,860 B2
(45) Date of Patent: Nov. 27, 2012

(54) ELECTRICAL DEVICE WITH ZOOMING FUNCTION AND ZOOMING METHOD FOR THEREOF

(75) Inventors: Wei-Cheng Huang, Taipei County (TW); Mei-Yi Tsai, Taipei County (TW); Shang-Yuan Yuan, Taipei County (TW)

(73) Assignee: Chicony Electronics Co., Ltd., New Taipei (TW)

( * ) Notice: Subject to any disclaimer, the term of this patent is extended or adjusted under 35 U.S.C. 154(b) by 171 days.

(21) Appl. No.: 12/912,785

(22) Filed: Oct. 27, 2010

(65) Prior Publication Data

US 2011/0285877 A1  Nov. 24, 2011

(30) Foreign Application Priority Data

May 21, 2010 (TW) .............................. 99116351 A

(51) Int. Cl.
*H04N 5/262* (2006.01)
(52) U.S. Cl. .................. 348/240.99; 348/240.1
(58) Field of Classification Search ............. 348/240.99, 348/240.1–240.3
See application file for complete search history.

(56) References Cited

U.S. PATENT DOCUMENTS

| | | | |
|---|---|---|---|
| 2008/0055429 A1* | 3/2008 | Yoshida | 348/240.99 |
| 2010/0156941 A1* | 6/2010 | Seung | 345/660 |
| 2010/0214445 A1* | 8/2010 | Chronqvist | 348/231.99 |
| 2010/0245630 A1* | 9/2010 | Kurokawa | 348/240.99 |
| 2011/0199516 A1* | 8/2011 | Laberge et al. | 348/240.99 |

* cited by examiner

*Primary Examiner* — Kelly L Jerabek
(74) *Attorney, Agent, or Firm* — CKC & Partners Co., Ltd.

(57) ABSTRACT

An electrical device with zooming function includes an image-sensing module, a display unit and a processing unit. The processing unit is electrically connected to the image-sensing module and the display unit respectively. The image-sensing module senses an image. The processing unit includes an image display module, a selecting module and a zooming-control module. The image display module makes the display unit display the sensed image. The selecting module receives a selection signal for selecting a reference point from the image displayed on the display unit. The zooming-control module makes the image-sensing module sense another image, the reference point is in the center of which, by zooming.

14 Claims, 5 Drawing Sheets

ELECTRICAL DEVICE WITH ZOOMING FUNCTION AND ZOOMING METHOD FOR THEREOF

RELATED APPLICATIONS

This application claims priority to Taiwan Application Serial Number 99116351, filed May 21, 2010, which is herein incorporated by reference.

BACKGROUND

1. Technical Field

The present invention relates to an electrical device and a controlling method for an electrical device. More particularly, the present invention relates to an electrical device with zooming function and a zooming method for an electrical device with zooming function.

2. Description of Related Art

As technology developed, more and more conventional devices are digitalized. Since electrical sensors, such as Complementary Metal Oxide Semiconductor (CMOS) and Charge-coupled Device (CCD), are developed, cameras are also digitalized.

Generally, a digital camera includes a lens, an electrical sensor and a display unit. Light goes through the lens and is sensed by the electrical sensor. The electrical sensor converts the light into a digital data, such as a picture file. Hence, the display unit can display the sensed picture file.

Wherein, a closer or more distant view of an image can be sensed by a digital camera after zoom. However, in the prior art, a digital camera can only take the center of the sensed image as the zooming center. For example, FIGS. 1A-1B illustrate an image sensed by a general digital camera during zoom process. In FIG. 1A, an image "A" is sensed by the general digital camera. Then, during zoom in process, the general digital camera may take the center C of the sensed image in FIG. 1A as the center for zoom in. Hence, the image sensed by the general digital camera after zoom in may be as shown in FIG. 1B. Therefore, if users want to take a point other than the center of the sensed image as the center for zooming, users have to move digital cameras.

SUMMARY

According to one embodiment of this invention, an electrical device with zooming function is provided. When a point of an image sensed by electrical device with zooming function is selected, the electrical device with zooming function zooms to sense another image, the selected point is in the center of which. The electrical device with zooming function includes an image-sensing module, a display unit and a processing unit. The processing unit is electrically connected to the image-sensing module and the display unit respectively. The image-sensing module senses an image. The processing unit includes an image display module, a selecting module and a zooming-control module. The image display module makes the display unit display the sensed image. The selecting module receives a selection signal for selecting a reference point from the image displayed on the display unit. The zooming-control module makes the image-sensing module sense another image, the reference point is in the center of which, by zooming.

According to another embodiment of this invention, a zooming method for an electrical device with zooming function is provided. In the zooming method for an electrical device with zooming function, when a point of an image sensed by electrical device with zooming function is selected, the electrical device with zooming function zooms to sense another image, the selected point is in the center of which. The electrical device with zooming function includes a display unit. The zooming method for the electrical device with zooming In function includes the following steps: The electrical device with zooming function senses an image. The sensed image is displayed on the display unit. A selection signal for selecting a reference point from the image displayed on the display unit is received. The electrical device with zooming function is made to sense another image, the reference point is in the center of which, by is zooming.

Above all, when a point of an image sensed by the electrical device with zooming function is selected, a closer or more distant view, the point is in the center of which, may be generated. Therefore, any point of the image sensed by the electrical device with zooming function can be selected to be the zooming center for a closer or more distant view without moving the electrical device with zooming function.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows:

FIGS. 3A-3C illustrate an embodiment that the electrical device with zooming function 100 utilizes digital zooming function to make the is image-sensing module 110 sense another image, the reference point is in the center of which;

FIGS. 4A-4D illustrate an embodiment that the electrical device with zooming function 100 utilizes digital zooming function and optical zooming function to make the image-sensing module 110 sense another image, the reference point is in the center of which.

DETAILED DESCRIPTION

Figure 1A:
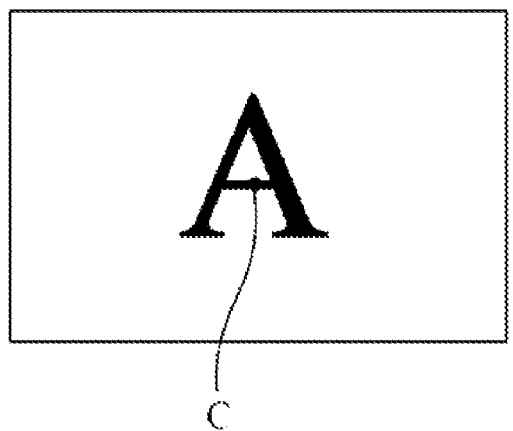
FIGS. 1A-1B illustrate an image sensed by a general digital camera to during zoom process.
Figure 1B:
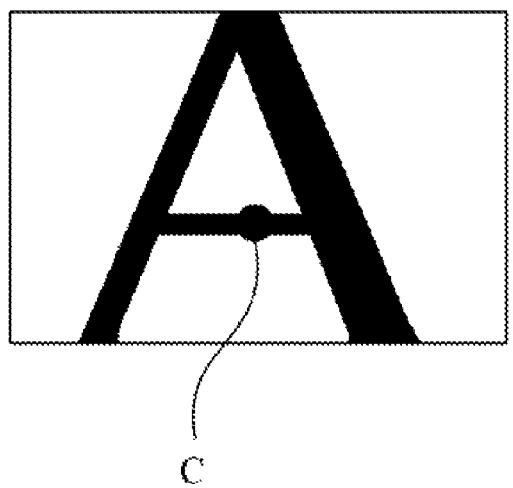

Reference will now be made in detail to the present embodiments of the invention, examples of which are illustrated in the accompanying drawings. Wherever possible, the same reference numbers are used in the drawings and the description to refer to the same or like parts.

Figure 2:
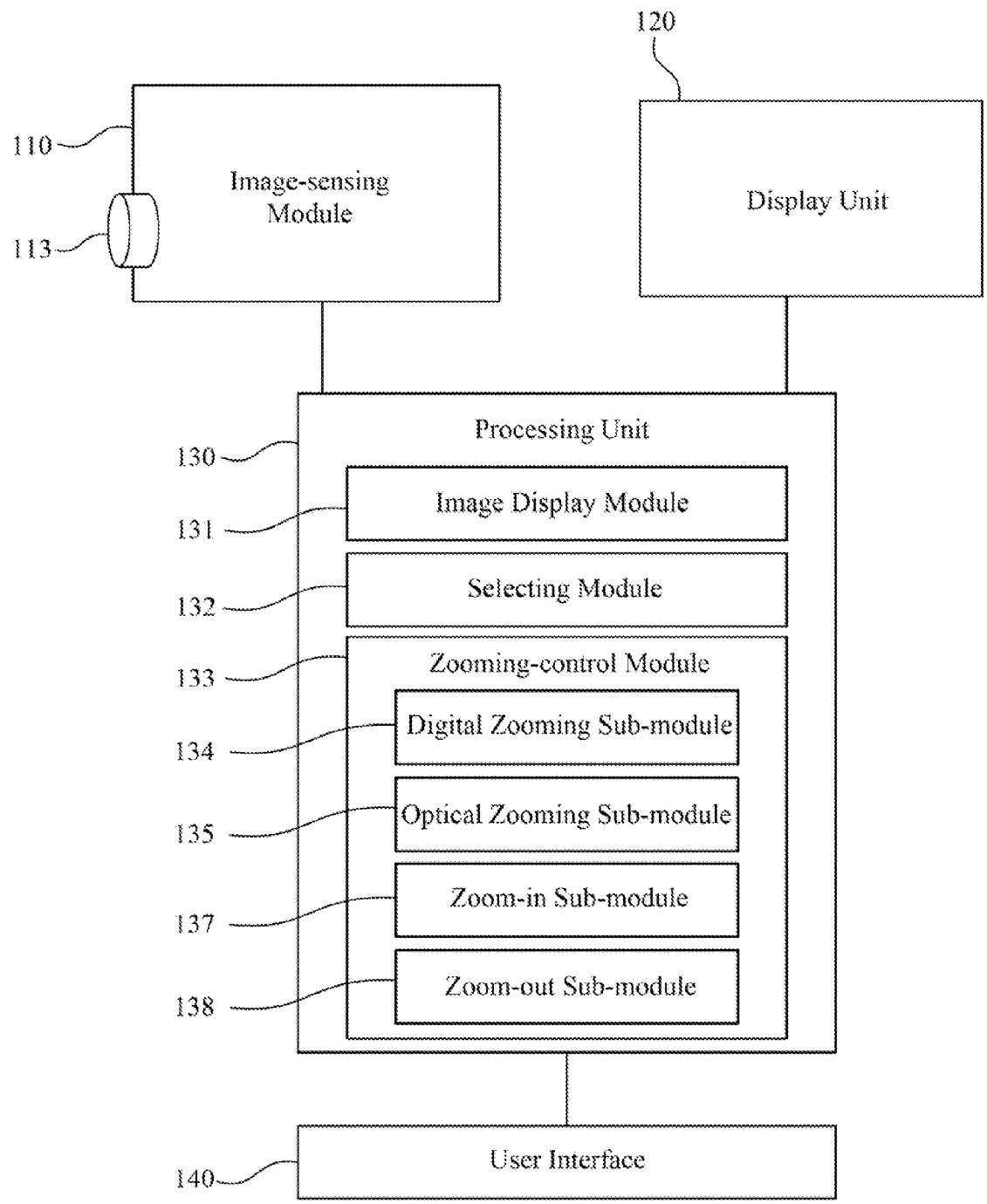
FIG. 2 is a block diagram of an electrical device with zooming function according to one embodiment of this invention.

FIG. 2 is a block diagram of an electrical device with zooming function according to one embodiment of this invention. When a point of an image sensed by electrical device with zooming function is selected, the electrical device with zooming function zooms to sense another image, the selected point is in the center of which.

The electrical device with zooming function 100 includes an image-sensing module 110, a display unit 120 and a processing unit 130. The processing unit 130 is electrically connected to the image-sensing module 110 and the display unit 120 respectively. The processing unit 130 includes an image display module 131, a selecting module 132 and a zooming-control module 133.

The image-sensing module 110 senses an image. The image display module 131 makes the display, unit 120 display the sensed image. The selecting module 132 receives a selection signal for selecting a reference point from the image displayed on the display unit 120. Wherein, the selection signal can be generated through a touch panel, a user interface or any other input device. Hence, in one embodiment of this disclosure, a touch panel may be taken as the display unit 120 and the user interface 140 at the same time. Therefore, if the touch panel, which is taken as the user interface 140, detects a point of the image displayed on the touch panel, which is taken as the display unit 120, the touch panel takes the touched point as the reference point and generates the selection signal for selecting the reference point from the image displayed on the touch panel. In another embodiment of this disclosure, the electrical device with zooming function 100 may further include a user interface 140 electrically connected with the processing unit 130. The user interface 140 may be a mouse, arrow keys, a point device or any other user interface. Therefore, users can select a point of the image displayed on the display unit 120 as the reference point through the user interface 140, such that the user interface 140 generates the selection signal according to the reference point.

The zooming-control module 133 makes the image-sensing module 110 sense another image, the reference point is in the center of which, by zooming. Wherein, the zooming-control module 133 can make another image sensed by the image-sensing module 110, the reference point is in the center of which, displayed as a closer or more distant view on the display unit 120 by zooming. Therefore, the zooming-control module 133 may include a zoom-in sub-module 137 or a zoom-out sub-module 138. The zoom-in sub-module 137 sets the electrical device with zooming function 100 to a zoom-in mode. When the electrical device with zooming function 100 is set to the zoom-in mode, the zooming-control module 133 makes the image-sensing module 110 sense another image, the reference point is in the center of which, by zoom-in. Therefore, the image, the reference point is in the center of which, after zoom in can be displayed as a closer view on the display unit 120. The zoom-out sub-module 138 sets the electrical device with zooming function 100 to a zoom-out mode. When the electrical device with zooming function 100 is set to the zoom-out mode, the zooming-control module 133 makes the image-sensing module 110 sense another image, the reference point is in the center of which, by zoom-out. Therefore, the image, the reference point is in the center of which, after zoom out can be displayed as a more distant view on the display unit 120.

The zooming-control module 133 may make the image-sensing module 110 utilize optical zooming, digital zooming or combination thereof to makes the image-sensing module 110 sense another image, the reference point is in the center of which. Therefore, the zooming-control module 133 may include a digital zooming sub-module 134 or an optical zooming sub-module 135. The digital zooming sub-module 134 controls digital zooming function of the image-sensing module 110. The optical zooming sub-module 135 controls optical zooming function of the image-sensing module 110. Wherein, the optical zooming sub-module 135 may drive a zoom lens 113 of the image-sensing module 110 for optical zooming function.

Figure 3A:
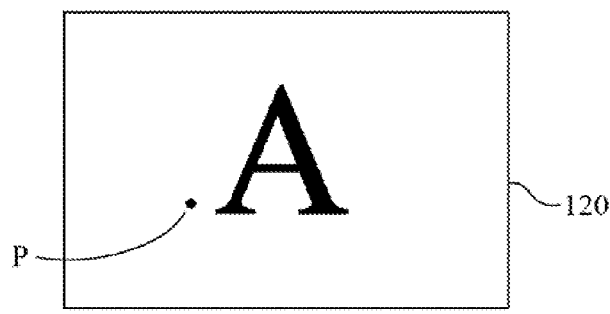
Figure 3B:
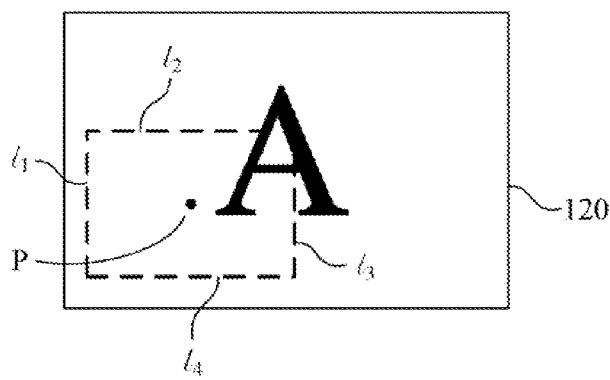
Figure 3C:
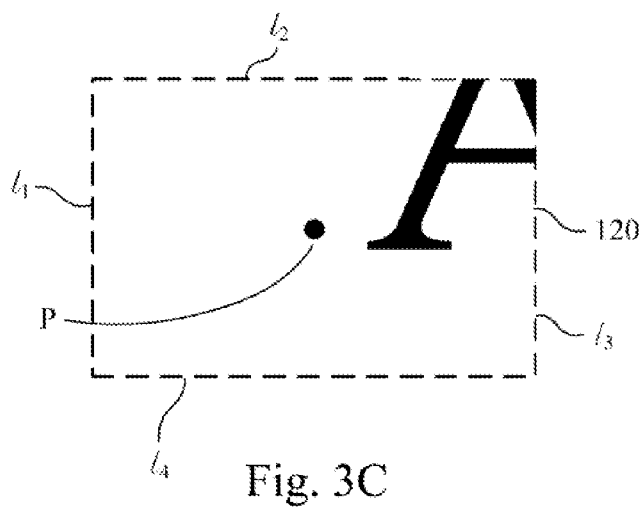

In one embodiment of this disclosure, the zooming-control module 133 makes the image-sensing module 110 sense another image, the reference point is in the center of which, utilizing digital zooming. FIGS. 3A-3C illustrate an embodiment that the electrical device with zooming function 100 utilizes digital zooming function to make the image-sensing module 110 sense another image, the reference point is in the center of which. In FIG. 3A, the image display module 131 make the image "A" sensed by the image-sensing module 110 displayed on the display unit 120. The selecting module 132 receives a selection signal for selecting a reference point P from the image displayed on the display unit 120. In FIG. 3B, when the electrical device with zooming function 100 is set to the zoom in mode, the zooming-control module 133 calculates several boundaries /1, /2, /3 and /4 of the image, the reference point P will be in the center of which. In FIG. 3C, the zooming-control module 133 can control the digital zooming sub-module 134 to utilize digital zooming function zoom to the boundaries /1, /2, /3 and /4. Hence, the image-sensing module 110 can sense the image, the reference point is in the center of which, after digital zooming. In other embodiments, when the electrical device with zooming function 100 is set to the zoom out mode, the zooming-control module 133 may utilize zoom out to make image-sensing module 110 sense another image, the reference point is in the center of which, after digital zoom out, which should not be limited in this embodiment.

In another embodiment of this disclosure, the zooming-control module 133 may utilize the digital zooming sub-module 134 and the optical zooming sub-module 135 to make the image-sensing module 110 sense another image, the reference point is in the center of which. For example, the zooming-control module 133 may calculate several boundaries of the image, the reference point will be in the center of which, after zooming. The optical zooming sub-module 135 makes the image-sensing module 110 optically zooms to at least one of the calculated boundaries. The digital zooming sub-module 134 digitally zooms to all the calculated boundaries, such that the image-sensing module 110 may sense the image, the reference point is in the center of which, after zooming. Therefore, the image sensed after zooming may have better image quality derived from the optical zooming.

Figure 4A:
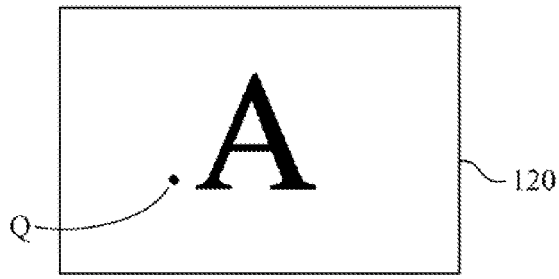
Figure 4B:
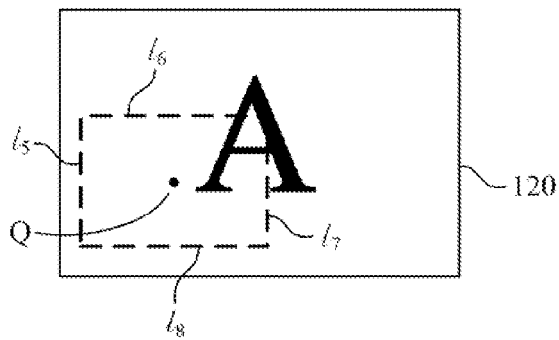
Figure 4C:
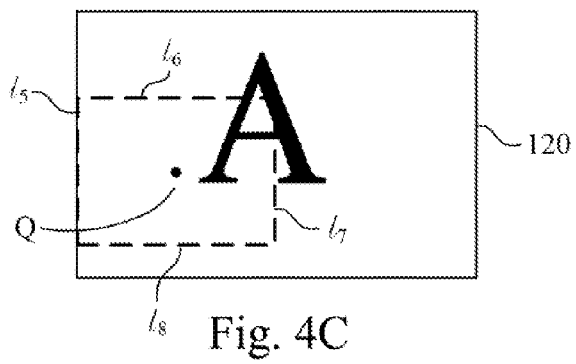
Figure 4D:
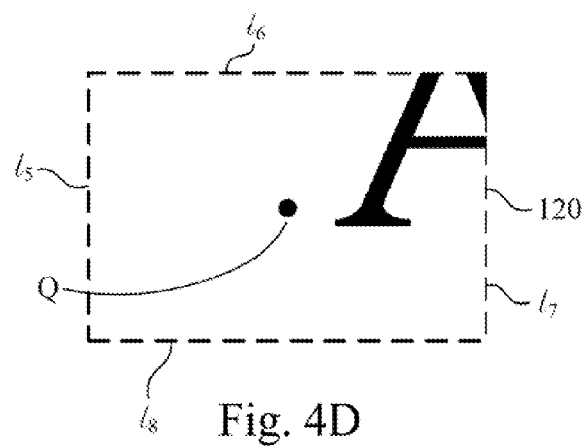

FIGS. 4A-4D illustrate an embodiment that the electrical device with zooming function 100 utilizes digital zooming function and optical zooming function to make the image-sensing module 110 sense another image, the reference point is in the center of which. In FIG. 4A, the image display module 131 make the image "A" sensed by the image-sensing module 110 displayed on the display unit 120. The selecting module 132 receives a selection signal for selecting a reference point Q from the image displayed on the display unit 120. In FIG. 4B, when the electrical device with zooming function 100 is set to the zoom in mode, the zooming-control module 133 calculates several boundaries /5, /6, /7 and /8 of the image, the reference point Q will be in the center of which. In FIG. 4C, the optical zooming sub-module 135 makes the image-sensing module 110 optical-zooms to the boundary /5. In FIG. 4D, the digital zooming sub-module 134 digital zooms to all the calculated boundaries /5, /6, /7 and /8, such that the image-sensing module 110 may sense the image, the reference point is in the center of which, after zooming. In other embodiments, when the electrical device with zooming function 100 is, set to the zoom out mode, the zooming-control module 133 may utilize zoom out to make image-sensing module 110 sense another image, the reference point is in the center of which, after digital and optical zoom out, which should not be limited in this embodiment.

Figure 5:
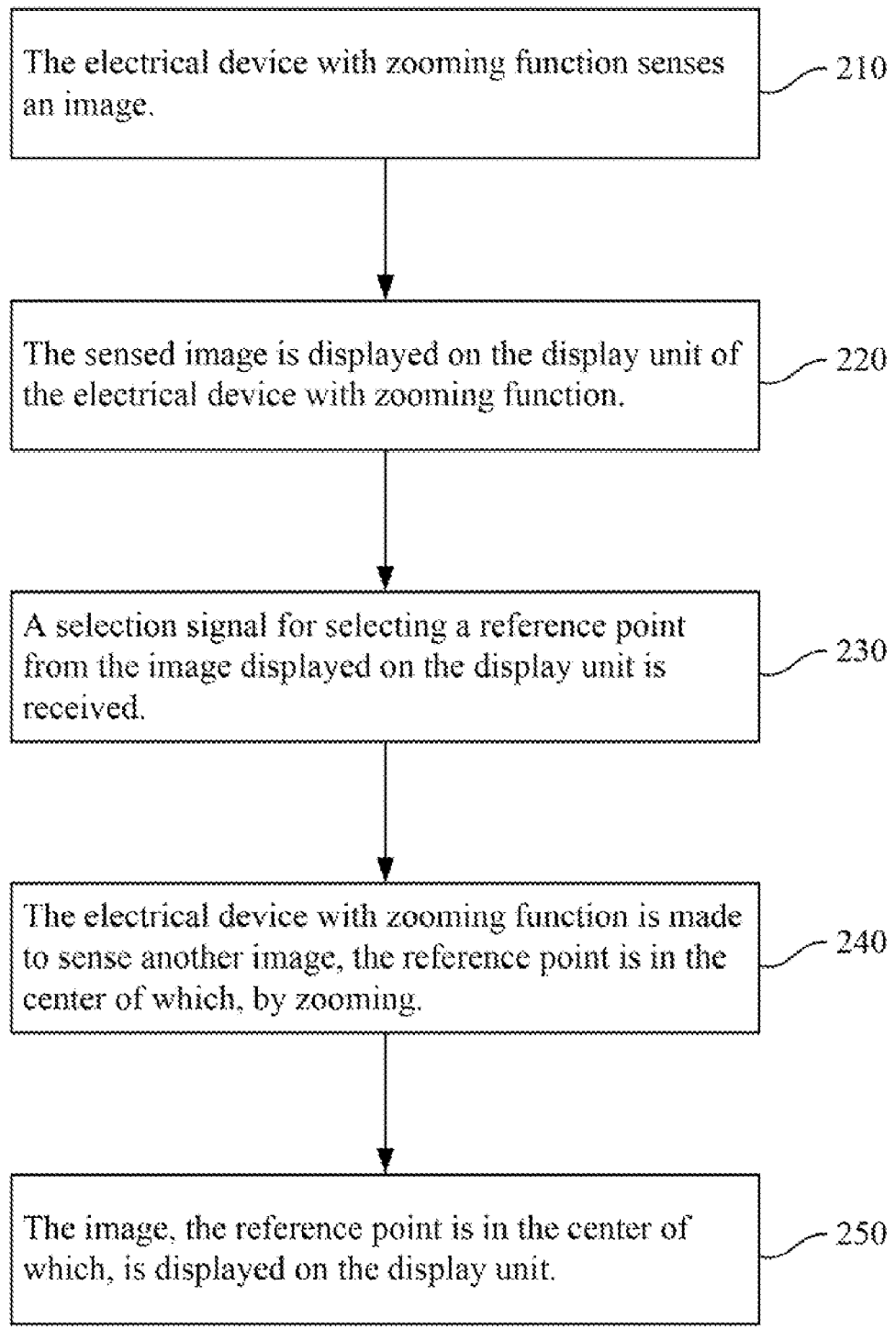
FIG. 5 is a flow diagram of a zooming method for an electrical device with zooming function according to one embodiment of this invention.

FIG. 5 is a flow diagram of a zooming method for an electrical device with zooming function according to one embodiment of this invention. In the zooming method for an electrical device with zooming function, when a point of an image sensed by electrical device with zooming function is selected, the electrical device with zooming function zooms to sense another image, the selected point is in the center of which. The zooming method for an electrical device with zooming function may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives. In addition, the zooming method for an electrical device with zooming function may take the form of a program product stored on a storage medium having instructions in embodied in the medium for electrical devices to execute. The zooming method for the electrical device with zooming function 200 includes the following steps:

In step 210, the electrical device with zooming function senses an image.

In step 220, the sensed image is displayed on a display unit of the electrical device with zooming function.

In step 230, a selection signal for selecting a reference point from the image displayed on the display unit is received. Wherein, the selection signal can be generated through a touch panel, a user interface or any other input device. Hence, in one embodiment of this disclosure, a touch panel may be taken as the display unit. Therefore, if the touch panel detects a point of the image displayed on the touch panel, the touch panel takes the touched point as the reference point and generates the selection signal for selecting the reference point from the image displayed on the touch panel. In another embodiment of this disclosure, the electrical device with zooming function may further include a user interface, such as a mouse, arrow keys, a point device or any other user interface. Therefore, users can select a point of the image displayed on the display unit as the reference point through the user interface, such that the user interface generates the selection signal according to the reference point.

In step 240, the electrical device with zooming function is made to sense another image, the reference point is in the center of which, by zooming. Wherein the zooming utilized in the step 240 may be optical zoom, digital zoom or combination thereof. Hence, in one embodiment, step 240 may utilize digital zoom to make the electrical device with zooming function sense another image, the reference point is in the center of which, after digital zoom. In another embodiment, the step 240 may utilize digital zoom and optical zoom to make the electrical device with zooming function sense another image, the reference point is in the center of which, after digital zoom and optical zoom. For example, several boundaries of the image, the reference point will be in the is center of which, after zooming may be calculated. The electrical device with zooming function optically zooms to at least one of the calculated boundaries. Then, the electrical device with zooming function digitally zooms, to all the calculated boundaries, such that the electrical device with zooming function may sense the image, the reference point is in the center of which, after zooming. Therefore, the image sensed after zooming may have better image quality derived from the optical zooming.

In step 250, the image, the reference point is in the center of which, may be displayed on the display unit of the electrical device with zooming function. Therefore, the image, the reference point is in the center of which, displayed on the display unit of the electrical device may be a closer or more distant view. Wherein, when the electrical device with zooming function is set to the zoom-in mode, zoom-in is utilized to make the electrical device with zooming function sense another image, the reference point is in the center of which, by zoom-in. Hence, the image, the reference point is in the center of which, may be a closer view. Besides, when the electrical device with zooming function is set to the zoom-out mode, zoom-out is utilized to make the electrical device with zooming function sense another image, the reference point is in the center of which, by zoom-out. Hence, the image, the reference point is in the center of which, may be a more distant view.

Above all, when a point of an image sensed by the electrical device with zooming function is selected, a closer or more distant view, the point is in the center of which, may be generated. Therefore, any point of the image sensed by the electrical device with zooming function can be selected to be the zooming center for a closer or more distant view without moving the electrical device with zooming function.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electrical device with zooming function, comprising:
   an image-sensing module, sensing an image;
   a display unit; and
   a processing unit, electrically connected to the image-sensing module and the display unit, comprising:
      an image display module, making the display unit display the sensed image;
      a selecting module, receiving a selection signal for selecting a reference point from the image displayed on the display unit; and
      a zooming-control module, making the image-sensing module sense another image, the reference point is in the center of which, by zooming, wherein the zooming-control module comprises:
         a digital zooming sub-module, controlling digital zooming function of the image-sensing module; and
         an optical zooming sub-module, controlling optical zooming function of the image-sensing module;
         wherein the zooming-control module makes the image-sensing module sense the image, the reference point is in the center of which utilizing the zooming functions of the digital zooming sub-module and the optical zooming sub-module zooming,
         wherein the zooming-control module calculates a plurality of boundaries of the image, the reference point is in the center of which, after zooming, the optical zooming sub-module zooms to at least one of the calculated boundaries to make the image-sensing module sense an optical zoomed image, and the digital zooming sub-module zooms to make the image-sensing module sense the image, the reference point is in the center of which, after zooming utilizing the optical zoomed image.

2. The electrical device with zooming function of claim 1, wherein
the zooming-control module further controls the digital zooming sub-module to drive the digital zooming function of the image-sensing module to sense another image, the reference point is in the center of which.

3. The electrical device with zooming function of claim 1, wherein the image-sensing module further comprises:
a zoom lens, wherein the optical zooming sub-module drives the zoom lens to provide the optical zooming function.

4. The electrical device with zooming function of claim 1, further comprising:
a user interface, electrically connected with the processing unit, wherein the selection signal is generated through the user interface.

5. The electrical device with zooming function of claim 4, further comprising:
a touch panel, comprising the display unit and the user interface, wherein the touch panel generates the selection signal according to the touched reference point when the touch panel detects the touched reference point.

6. The electrical device with zooming function of claim 1, wherein the zooming-control module comprises:
a zoom-in sub-module, setting the electrical device with zooming function to a zoom-in mode, wherein the zooming-control module makes the image-sensing module sense another image, the reference point is in the center of which, by zoom-in when the electrical device with zooming function is set to the zoom-in mode.

7. The electrical device with zooming function of claim 1, wherein the zooming-control module comprises:
a zoom-out sub-module, setting the electrical device with zooming function to a zoom-out mode, wherein the zooming-control module makes the image-sensing module sense another image, the reference point is in the center of which, by zoom-out when the electrical device with zooming function is set to the zoom-out mode.

8. A zooming method for an electrical device with zooming function, wherein the electrical device with zooming function comprises a display unit, the zooming method for the electrical device with zooming function comprises:
making the electrical device with zooming function sense an image;
displaying the sensed image on the display unit,
receiving a selection signal for selecting a reference point from the image displayed on the display unit; and
making the electrical device with zooming function sense another image, the reference point is in the center of which, by zooming, wherein making the electrical device with zooming function sense another image, the reference point is in center of which, by zooming comprises:
calculating a plurality of boundaries of the image, the reference point is in the center of which, after zooming;
optical zooming to at least one of the calculated boundaries to make the image-sensing module sense an optical zoomed image; and
digital zooming to make the image-sensing module sense the image the reference point is in the center of which, after zooming utilizing the optical zoomed image.

9. The zooming method for an electrical device with zooming function of claim 8, wherein digital zooming function is utilized to make the electrical device with zooming function sense another image, the reference point is in the center of which.

10. The zooming method for an electrical device with zooming function of claim 8, wherein digital zooming function and optical zooming function are utilized to make the electrical device with zooming function sense another image, the reference point is in the center of which.

11. The zooming method for an electrical device with zooming function of claim 8, wherein zoom-in is utilized to make the electrical device with zooming function sense another image, the reference point is in the center of which, by zoom-in when the electrical device with zooming function is set o the zoom-in mode.

12. The zooming method for an electrical device with zooming function of claim 8, wherein zoom-out is utilized to make the electrical device with zooming function sense another image, the reference point is in the center of which, by zoom-out when the electrical device with zooming function is set to the zoom-out mode.

13. The zooming method for an electrical device with zooming function of claim 8, wherein the electrical device with zooming function further comprises a user interface, wherein the selection signal is generated through the user interface.

14. The zooming method for an electrical device with zooming function of claim 13, wherein the user interface is a touch panel, and the display unit, which displays the sensed image, is the touch panel,
wherein if the touch panel detects that a point of the image displayed on the touch panel is touched, the touch panel takes the touched point as the reference point and generates the selection signal according to the reference point.

* * * * *